United States Patent [19]
Huang et al.

[11] Patent Number: 5,796,893
[45] Date of Patent: Aug. 18, 1998

[54] METHOD AND SYSTEM FOR PROVIDING AN IMPROVED OPTICAL COUPLER

[75] Inventors: Yong Huang, San Jose; Yu Zheng, Sunnyvale, both of Calif.

[73] Assignee: Oplink Communications, Inc., San Jose, Calif.

[21] Appl. No.: 720,079

[22] Filed: Sep. 27, 1996

[51] Int. Cl.$^6$ .................... G02B 6/26; G02B 6/42
[52] U.S. Cl. .................... 385/43; 219/130.1; 65/384
[58] Field of Search .................... 219/130.01; 385/43, 385/140, 141, 147, 901

[56] References Cited

U.S. PATENT DOCUMENTS

| | | | |
|---|---|---|---|
| 5,093,553 | 3/1992 | Harvey et al. | 219/130.01 |
| 5,171,345 | 12/1992 | Takemura | 65/2.41 |
| 5,445,319 | 8/1995 | Pan et al. | 239/1 |

*Primary Examiner*—Akm E. Ullah
*Attorney, Agent, or Firm*—Sawyer & Associates

[57] ABSTRACT

A system and method for providing an optical coupler is disclosed. The system and method comprise providing a plurality of optical fibers formed together in parallel and providing a torch capable of maintaining a temperature of approximately 1200 degrees Celsius, plus or minus approximately 50 degrees Celsius on the plurality of optical fibers, for a predetermined time. An optical coupler made in accordance with the method and system possesses improved uniformity and insertion loss.

19 Claims, 2 Drawing Sheets

METHOD AND SYSTEM FOR PROVIDING AN IMPROVED OPTICAL COUPLER

FIELD OF THE INVENTION

The present invention relates to a method and system for providing an optical coupler and more particularly to a method and system for providing an optical coupler with improved uniformity and insertion loss.

BACKGROUND OF THE INVENTION

Optical couplers are typically utilized to separate or combine an optic signal, such as an optic signal in a fiber optic cable. For example, a 1×n optical coupler splits an input signal into n output signals. Similarly, an n×1 optical coupler combines n input signals into a single output signal.

Typical optical couplers are comprised of a plurality of fiber optic cables. Where an optic signal is to be combined, the number of inputting signals is greater than the number of outputting signals. Where an optic signal is to be split, the number of cables inputting a signal is less than the number of cables outputting a signal. A 1×n optical coupler, for example, has one input cable and n output cables.

In order to form a conventional optic coupler, a plurality of fiber optic cables are typically fused together. There are two conventional methods for forming fusing optical cables together. One method comprises twisting optical fibers and then fusing them together. The twisting tension causes poor polarization sensitivity and poor reliability. The other method provides for providing optical fibers in parallel together. Although the parallel optical fibers provide improved performance over the twisted optical fibers, the polarization sensitivity is still not adequate for some applications.

In order to fuse the fibers, the fibers are generally placed in contact with each other. A torch, usually fueled with hydrogen gas, is then used to heat a portion of the fibers until the fibers fuse. The fibers are typically placed under tension to make the desired joint. Typically, this process is computer controlled and occurs at a single work station. In order to have a different number of input fibers than output fibers, a portion of each of a predetermined number of fibers is then removed.

The performance of an optical coupler is partially determined by the insertion loss and the uniformity of the optical coupler. The insertion loss for an optical coupler is the total intensity of all signals on all cables exiting the coupler divided by the total input intensity. For better performance, the insertion loss should be low. The uniformity of the optical coupler is the difference in the intensities between each of the output cables of the optical coupler. The uniformity should also be low for better performance of the optical coupler.

Both the insertion loss and the uniformity show variations with the wavelength of the signal transmitted. It is desirable to minimize these variations in uniformity and insertion loss with wavelength. Most systems use a wavelength of 1310 nm or 1550, plus or minus 10 or 40 nm, depending on the specifications. Consequently, most users are primarily concerned with variations over this range of wavelengths. However, an optical coupler having properties uniform enough to be used over a larger range of wavelengths is desirable.

Although the use of a mixture of hydrogen and oxygen gas has been disclosed, most conventional systems for providing an optical coupler utilize hydrogen gas in order to fuse the fibers. Consequently, typical systems achieve temperatures of approximately 700 degrees Celsius during the fusion of the fiber optic cables. Although it is known that insertion loss and uniformity generally decrease with increasing torch temperature, higher temperatures may make the gas unstable. Conventional systems typically provide optical couplers having uniformity and insertion loss adequate for repeatably providing only 1×2 or 2×1 optical couplers. Consequently, typical optical couplers have higher insertion loss and uniformity than is desired.

Accordingly, what is needed is a system and method for providing an optical coupler having lower insertion loss and uniformity. The present invention addresses such a need.

SUMMARY OF THE INVENTION

The present invention provides a method and system for providing an optical coupler. The method and system comprise providing a plurality of fibers formed together in parallel and then providing a torch capable of maintaining a temperature of approximately 1200 degrees Celsius on the plurality of optical fibers, plus or minus approximately 50 degrees Celsius, for a predetermined period of time.

According to the system and method disclosed herein, the present invention provides an optical coupler having reduced insertion loss and lower uniformity, thereby increasing overall performance of the optical coupler.

DETAILED DESCRIPTION OF THE INVENTION

Figure 1:
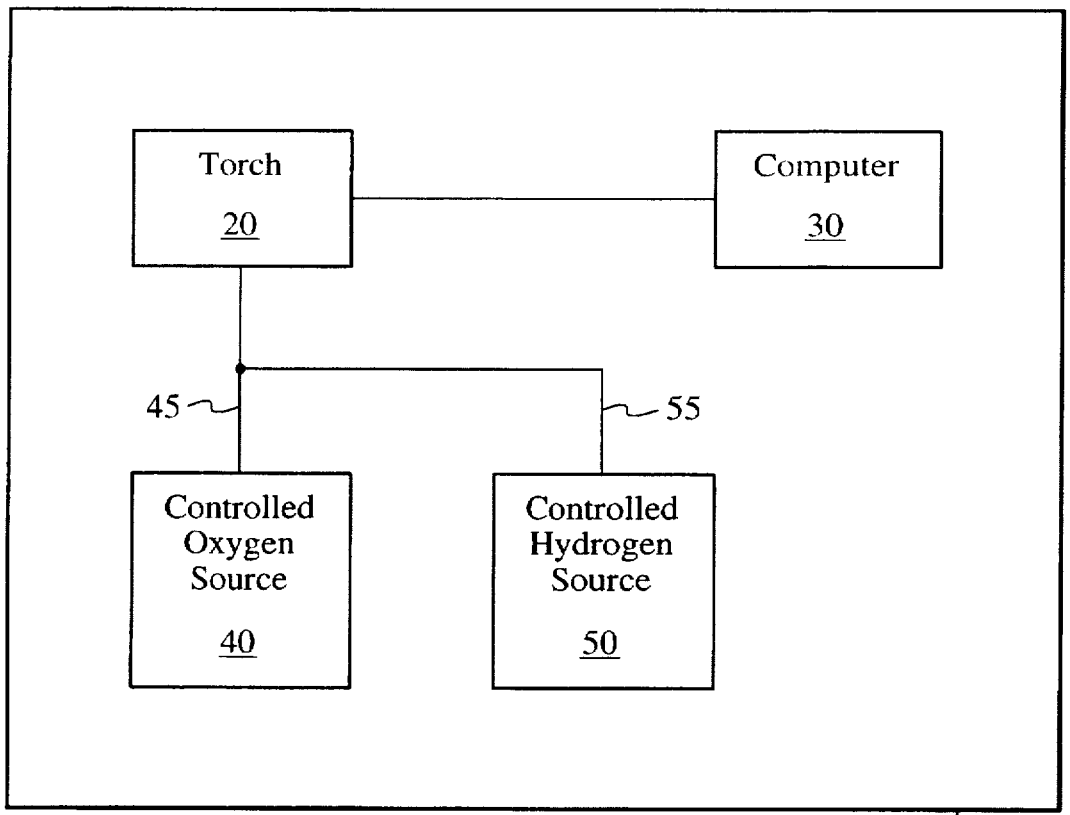
FIG. 1 is a block diagram of one embodiment of a system for providing an optical coupler in accordance with the present invention.

The present invention relates to an improvement in optical couplers. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Optical couplers are typically utilized to separate or combine an optic signal, such as an optic signal in a fiber optic cable. Optical couplers are typically comprised of a plurality of fiber optic cables. Where an optic signal is to be combined, the number of cables inputting a signal is typically greater than the number of cables outputting the signal. Where an optic signal is to be split, the number of cables inputting a signal is generally less than the number of cables outputting the signal.

The performance of an optical coupler is partially determined by the insertion loss and the uniformity of the optical coupler. The insertion loss for an optical coupler is the total intensity of all signals on all cables exiting the coupler divided by the total input intensity. The uniformity of the optical coupler is the difference in the intensities between each of the output cables of the optical coupler. For better performance. the insertion loss and uniformity should be low. Although both insertion loss and uniformity vary with the wavelength of the signal. most users employ wavelengths of 1310 or 1550 nm. plus or minus ten or forty nm. Consequently, most users are concerned with these wavelength ranges. It is desirable to minimize these variations in uniformity and insertion loss with wavelength.

In order to form a conventional optic coupler, a plurality of fiber optic cables are typically fused together using a computer controlled work station. There are two conventional methods for forming fusing optical cables together. One method comprises twisted optical fibers 15 as shown in FIG. 1A and then fusing them together. This twisting tension causes poor polarization sensitivity and poor reliability. The other method shown in FIG. 2B provides for providing optical fibers 17 in parallel together. Although this method provides improved performance over the twisted optical fibers, the polarization sensitivity is still not adequate for some applications. The fibers are generally placed in contact with each other in parallel and heated with a torch until the fibers fuse. Although the use of a mixture of hydrogen and oxygen gas has been disclosed, most conventional torches use hydrogen gas. Thus. typical systems achieve temperatures of approximately 700 degrees Celsius during the fusion of the fiber optic cables. Those with ordinary skill in the art know that uniformity and insertion loss generally decrease with increasing torch temperature. Consequently, typical optical couplers are have higher insertion loss and uniformity than is desired. Partly because of the higher insertion loss and uniformity, typical optical couplers are limited to 1×2 or 2×1 optical couplers. Similarly, typical optical couplers are limited in the range of wavelengths over which the couplers may be used.

The present invention provides for a method and system for providing an optical coupler having lower insertion loss and lower uniformity. The present invention will be described in terms of a computer controlled work station. However, one of ordinary skill in the art will readily recognize that this method and system will operate effectively for other types of systems for providing optical couplers.

Figure 1A:
FIG. 1A is a diagram of twisted optical fibers.
Figure 1B:
FIG. 1B is a diagram of parallel optical fibers.

To more particularly illustrate the method and system in accordance with the present invention, refer now to FIG. 1 depicting a block diagram of one embodiment of such a system. The system 10 comprises torch 20, computer 30, controlled oxygen gas source 40 and controlled hydrogen gas source 50. A mixture of oxygen and hydrogen gas is delivered from controlled sources 40 and 50, respectively, to torch 20 through lines 45 and 55. Controlled sources 40 and 50 are capable of precisely controlling the flow rate of oxygen and hydrogen gas, respectively, to achieve a desired mixture. In one embodiment of the system, the desired mixture is approximately ten milliliters per second of oxygen with sixty milliliters per second of hydrogen gas.

Although those with ordinary skill in the art understand that higher temperatures result in better insertion loss and uniformity, it was thought that this relationship continued over a wide range of temperatures. However, it has been discovered that a temperature range of approximately 1150-1250 degrees Celsius results in improved performance. In one embodiment, 1200 degrees Celsius provides significant improvements in insertion loss and uniformity. For optical couplers fused at temperatures above and below this range, uniformity and/or insertion loss rise, thereby degrading performance.

The mixture of oxygen and hydrogen gas aids the method and system in attaining the correct temperature range to achieve improved insertion loss and uniformity. Conventional systems for providing optical couplers using hydrogen gas may be incapable of safely reaching the optimal temperature range. In addition, because the variation in temperature must be relatively small, conventional systems which can reach approximately 1200 degrees Celsius may be incapable of controlling temperature during fusion of the fiber optic cables.

Figure 2A:
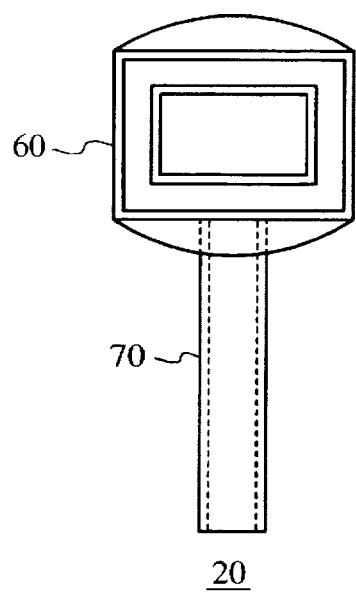
FIG. 2A is a is a schematic of the top view of a torch used in providing an optical coupler.
Figure 2B:
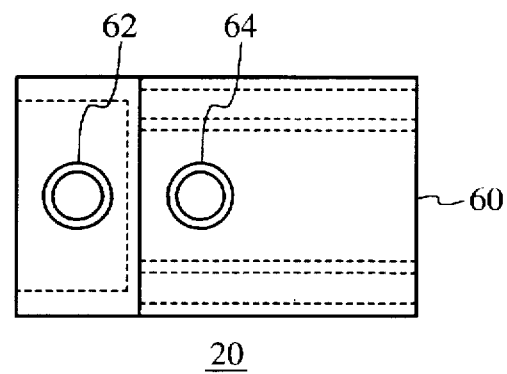
FIG. 2B is a is a schematic of the front view of a torch used in providing an optical coupler.
Figure 2C:
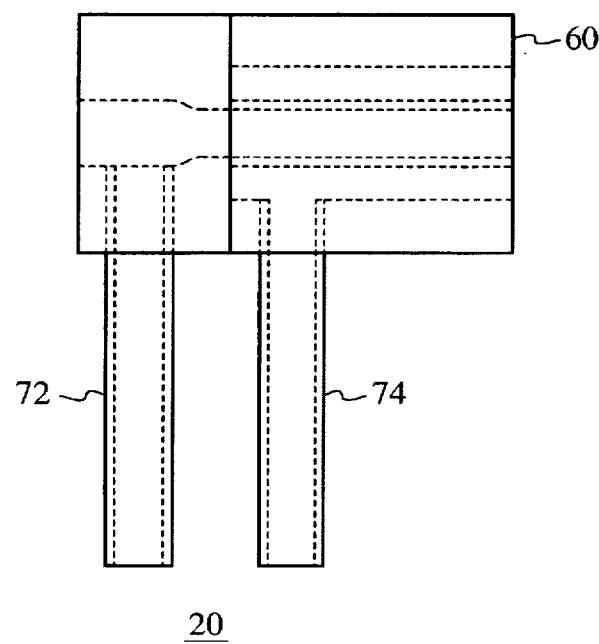
FIG. 2C is a is a schematic of the side view of a torch used in providing an optical coupler.

FIGS. 2A through 2C depict one embodiment of torch 20 in accordance with the method and system. FIG. 2A depicts the top view. FIG. 2B illustrates the front view, and FIG. 2C depicts the side view of the torch 20. Referring to FIG. 2A, the torch 20 of is comprised of head 60 and arm 70. The temperature of approximately 1200 degrees Celsius is maintained near head 60.

Referring now to FIG. 2B, the head 60 further comprises passages 62 and 64. The passages 62 and 64 are used to maintain the hydrogen and oxygen gas flow to the flame. FIG. 2C depicts a side view of the torch 20. Hydrogen inlet 72 and oxygen inlet 74 are connected with passages 62 and 64. Consequently, the gases may flow from a controlled external source to the torch head 60. Thus, the torch 20 may maintain a temperature of approximately 1200 degrees Celsius during the formation of an optical coupler.

A method and system has been disclosed for providing an optical coupler having improved uniformity and insertion loss. The system and method provide a controlled temperature of approximately 1150-1250 degrees Celsius during fusion of the optical coupler in which the optical fibers are placed in parallel. In one embodiment, the desired temperature range is achieved through the use of a controlled mixture of hydrogen and oxygen gas, the torch design.

Because of the improvement in uniformity and insertion loss, the method and system are capable of repeatably providing functional 1×3 and 3×1 optical couplers. In addition, the uniformity and insertion loss of the optical coupler have reduced variations with wavelength. Consequently, an optical coupler provided in accordance with the method and system may be capable of being utilized over a wider range of wavelengths.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for providing an optical coupler comprising:
    a plurality of optical fibers formed together in parallel, and
    a torch, capable of maintaining a temperature of approximately 1200 degrees Celsius, plus or minus approximately 50 degrees Celsius on the plurality of optical fibers, for a predetermined period of time.

2. The system of claim 1 further comprising a controllable fuel source coupled to the torch.

3. The system of claim 2 wherein the controllable fuel source further comprises a controllable oxygen source for providing oxygen to the torch and a controllable hydrogen source for providing hydrogen to the torch, the oxygen source and the hydrogen source providing the torch with a mixture of oxygen and hydrogen.

4. The system of claim 3 wherein the mixture of oxygen and hydrogen is approximately 10 millimeters per second of oxygen mixed with 60 milliliters per second of hydrogen.

5. The system of claim 4 further comprising a computer coupled to the torch for controlling the torch.

6. A system for providing an optical coupler comprising:
   a plurality of optical fibers bound together in parallel; and
   fusing means, capable of maintaining a temperature of approximately 1200 degrees Celsius, plus or minus approximately 50 degrees Celsius on the plurality of optical fibers, for a predetermined period of time.

7. The system of claim 6 further comprising a controllable fuel source coupled to the fusing means.

8. The system of claim 7 wherein the controllable fuel source further comprises a controllable oxygen source for providing oxygen to the fusing means and a controllable hydrogen source for providing hydrogen to the fusing means, the oxygen source and the hydrogen source providing the fusing means with a predetermined mixture of oxygen and hydrogen.

9. The system of claim 8 wherein the mixture of oxygen and hydrogen is approximately 10 milliliters per second of oxygen mixed with 60 milliliters per second of hydrogen.

10. The system of claim 9 further comprising a computer coupled to the fusing means for controlling the fusing means.

11. A method for providing an optical coupler comprising the steps of:

(a) providing a plurality of optical fibers formed together in parallel; and (b) providing a torch capable of maintaining a temperature of approximately 1000 degrees Celsius, plus or minus approximately 50 degrees Celsius, for a predetermined period of time.

12. The method of claim 11 further comprising the step of:

c) providing a controllable fuel source coupled to the torch.

13. The method of claim 12 wherein the controllable fuel source fuirther comprises a controllable oxygen source for providing oxygen to the torch and a controllable hydrogen source for providing hydrogen to the torch, the oxygen source and the hydrogen source providing the torch with a mixture of oxygen and hydrogen.

14. The method of claim 13 wherein the mixture of oxygen and hydrogen is approximately 10 milliliters per second of oxygen mixed with 60 milliliters per second of hydrogen.

15. The method of claim 14 further comprising the step of:

(e) providing a computer coupled to the torch for controlling the torch.

16. A method for providing an optical coupler comprising the steps of:

(a) providing a plurality of fibers bound together in parallel; and (b) providing fusing means capable of maintaining a temperature of approximately 1000 degrees Celsius, plus or minus approximately 50 degrees Celsius, for a predetermined period of time.

17. The method of claim 16 further comprising the step of:

c) providing a controllable fuel source coupled to the fusing means.

18. The method of claim 17 wherein the controllable fuel source further comprises a controllable oxygen source for providing oxygen to the fusing means and a controllable hydrogen source for providing hydrogen to the fusing means, the oxygen source and the hydrogen source providing the fusing means with a predetermined mixture of oxygen and hydrogen.

19. A method for providing an optical coupler comprising the steps of:

(a) providing a plurality of optical fibers formed together in parallel; and (b) fusing the plurality of optical fibers at a temperature of approximately 1200 degrees Celsius, plus or minus approximately 50 degrees Celsius.

* * * * *